United States Patent [19]

Cannon, Jr. et al.

[11] Patent Number: 5,689,238
[45] Date of Patent: Nov. 18, 1997

[54] OBJECT LOCATOR SYSTEM AND METHODS THEREFOR

[75] Inventors: Thomas C. Cannon, Jr., East Hanover; Theodore Sizer, Little Silver; Giovanni Vannucci, Middletown; Robert W. Wilson, Holmdel; Gregory A. Wright, Colts Neck, all of N.J.

[73] Assignee: Lucent Technologies, Inc., Murray Hill, N.J.

[21] Appl. No.: 612,650

[22] Filed: Mar. 8, 1996

[51] Int. Cl.⁶ ................................................ G08B 13/14
[52] U.S. Cl. ...................... 340/568; 340/571; 340/572; 340/825.49; 340/825.54
[58] Field of Search ................................. 340/568, 571, 340/572, 825.49, 825.54

[56] References Cited

U.S. PATENT DOCUMENTS

| | | | |
|---|---|---|---|
| 4,476,469 | 10/1984 | Lander | 340/539 |
| 4,636,950 | 1/1987 | Caswell et al. | 340/505 |
| 4,656,463 | 4/1987 | Anders et al. | 340/572 |
| 4,862,160 | 8/1989 | Ekchian et al. | 340/572 |
| 5,063,380 | 11/1991 | Wakura | 340/825.54 |
| 5,450,070 | 9/1995 | Massar et al. | 340/572 |

Primary Examiner—Jeffery Hofsass
Assistant Examiner—Mark S. Rushing

[57] ABSTRACT

Methods and systems for locating objects are disclosed. An electronic tag is attached to an object before storing the object. The electronic tag is identifiable by a unique response code. The response code and information pertaining to the object are recorded and the object may then be stored. To locate the object, the response code is entered into an interrogator. The interrogator sends a signal that causes the tag to emit a sound. The system thus allows for random storage of objects and is also useful for locating misplaced objects.

8 Claims, 5 Drawing Sheets

1

OBJECT LOCATOR SYSTEM AND METHODS THEREFOR

FIELD OF THE INVENTION

The present invention relates generally to methods and systems for locating objects. More particularly, the present invention relates to using electronic tags to locate objects such as documents.

BACKGROUND OF THE INVENTION

In conventional systems for locating documents, documents are filed in assigned places. When a document that is filed according to such a system is removed from its assigned place, its location is usually unknown to persons other than the individual who removed the document. If, after use, the document is re-filed in a place other than the assigned place, it may be very difficult to located again.

In other more advanced filing systems, computers and database software are used for document tracking. In such advanced systems, a document's location is entered into a computer database, and, whenever the document is moved, the database is updated accordingly. Such a computer database system fails when items are misfiled, movements are not recorded or information is incorrectly entered into the database. As in the case of simpler filing systems, if these or other filing errors occur, documents may not be found at their expected locations and may be very difficult or impossible to locate.

As such, there is a need for an improved filing/document location system.

SUMMARY OF THE INVENTION

According to the present invention an electronic tag is used to locate an object such as a document. In one embodiment, an electronic tag is attached to a document before filing the document. The electronic tag is identifiable by a unique response code. The response code and information pertaining to the document are logged and the document is filed. To locate the document, the response code is entered into an interrogator. The interrogator sends a signal which, in one embodiment, causes the tag to emit a sound. In other embodiments, the interrogator emits a radio signal allowing the user to locate the document. The present system thus allows for random storage of documents and is also useful for locating misplaced documents.

BRIEF DESCRIPTION OF THE DRAWINGS

Further features of the invention will become apparent from the following detailed description of specific embodiments thereof when read in conjunction with the accompanying drawings, in which like elements have like reference numerals and in which.

DETAILED DESCRIPTION OF THE INVENTION

The present invention provides methods and systems for locating objects such as documents. Although the following description is primarily directed to locating documents, it should be understood that the present invention may be used for locating other objects, as well. It should also be appreciated that the receiving, transmitting or locating devices used in conjunction with the present invention are not intended to be limited to any particular embodiments.

Figure 1:
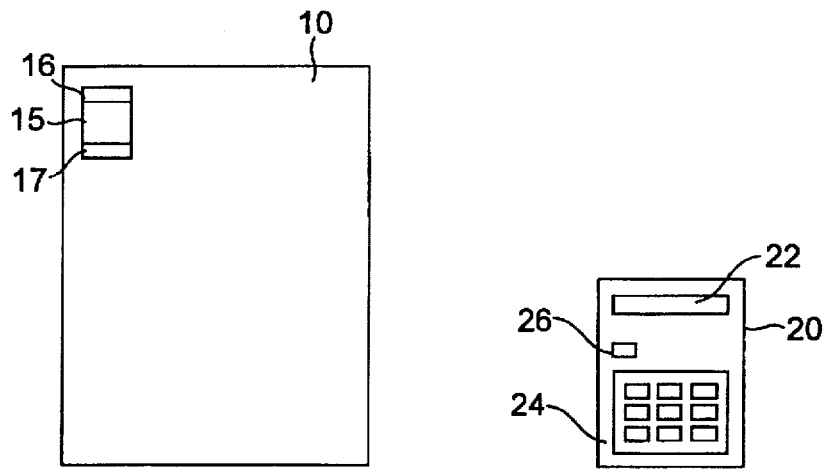
FIG. 1 is an exemplary embodiment of an object locator system according to the present invention.

An exemplary object locator system for use in accordance with the present invention is shown in FIG. 1. The exemplary system comprises an electronic tag 15 and an interrogator 20. The electronic tag 15 is uniquely identified by a response or identifier code. The electronic tag 15 is preferably physically adapted to be removably attached to an object, such as document 10. For example, the electronic tag 15 can include a piece of material 16 that can receive a staple so that the tag 15 may be stapled to the document 10. Alternatively, a semi-sticky glue can be disposed on the material 16 or other portion of the tag 15. Preferably, the electronic tag 15 may further include a peel-off sticker 17 that is marked with the response code of the tag. The response code can appear on the sticker 17 as an alpha-numeric sequence, a bar code or in any other suitable manner. Alternatively, the response code could be embossed on the body of the tag 15 itself. The electronic tag 15 is preferably small, flat and thin so that a "tagged" document uses a minimal amount of additional file space relative to an "un-tagged" document.

The interrogator 20 is operable, via appropriate circuitry, to detect and transmit the response code of the electronic tag 15. The interrogator 20 preferably includes a display 22, an alpha-numeric key pad 24 and a transmit button 26. The response code of the electronic tag 15 is entered, via the alpha-numeric keypad 24, into the interrogator 20. The entered code appears in the display 22. Once the user verifies that the code is correct, the user then pushes the transmit button 26 causing the interrogator 20 to broadcast the response code of the electronic tag 15.

In one embodiment, the electronic tag 15 includes circuitry suitable for an active response by the tag, i.e., the tag emits a sound, when its response code is broadcast. In another embodiment, the electronic tag 15 includes circuitry suitably configured for a passive response by the tag, i.e., the tag 15 modulates its reflection of the interrogator's radio signal. If the tag is passive, the interrogator 20 should include a receiver and other circuitry suitable for actively locating the tag 15. For example, in one embodiment, such locating circuitry enables the interrogator 20 to emit a sound which changes in frequency or some other manner to indicate relative proximity to the tag 15. In other embodiments, the locating circuitry causes the interrogator display 22 to provide a visual indication of tag proximity, such as signal strength, or an indication of distance to the tag 15. The design and implementation of such active and passive tags and locating circuitry is within the capabilities of those skilled in the art.

Figure 2:
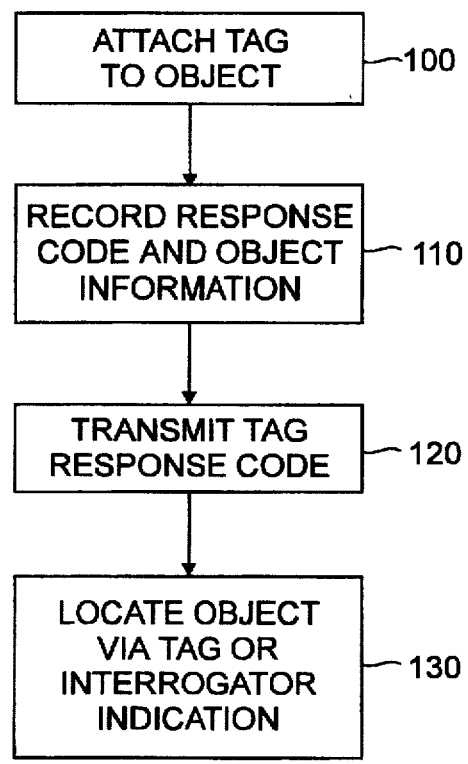
FIG. 2 is a flow diagram illustrating a method for locating an object using the system of FIG. 1.

A method for locating an object with the electronic tag 15 and interrogator 20 is shown in FIG. 2. In the following discussion, the object will be assumed to be a document, such as the document 10. A user attaches the electronic tag 15 to the document 10, for example by stapling, as indicated in operation block 100. In operation block 110, the tag's response code and document information are recorded in a storage device. In one embodiment, the storage device is a log book, and the peel-off sticker 17 is removed from the tag and stored in the log book with information pertaining to the document 10. In other embodiments, the storage device can be a computer storage medium, such as a floppy disk or hard drive. In the response code is in the form of a bar code, a bar code reader can be connected to a computer so that the code is read by the reader and transmitted to the computer and stored in an appropriate entry on the floppy disk or hard drive. Alternatively, in a further embodiment, the tag 15 is suitably configured to allow it to be programmed with a response code at the time of its use. After the electronic tag 15 is attached to the document 10, and the tag's response code and document information are recorded, the document can be filed in a filing cabinet, such as the filing cabinet 5 of FIG. 3 or some other suitable document storage apparatus.

To locate the tagged document 10 in storage, the response code for the tag 15 is entered into the interrogator 20 as indicated in operation block 120. Depending upon the specific electronic configuration of the tag and interrogator, as discussed above, one of either the tag 15 or the interrogator 20 will provide an indication of the tag's location and hence the location of the document 10, as noted in operation block 130. Using the present method, documents can be filed randomly as filing space permits. Further, the present invention provides a means for locating a document that has been improperly filed in an organized filing system.

Figure 3:
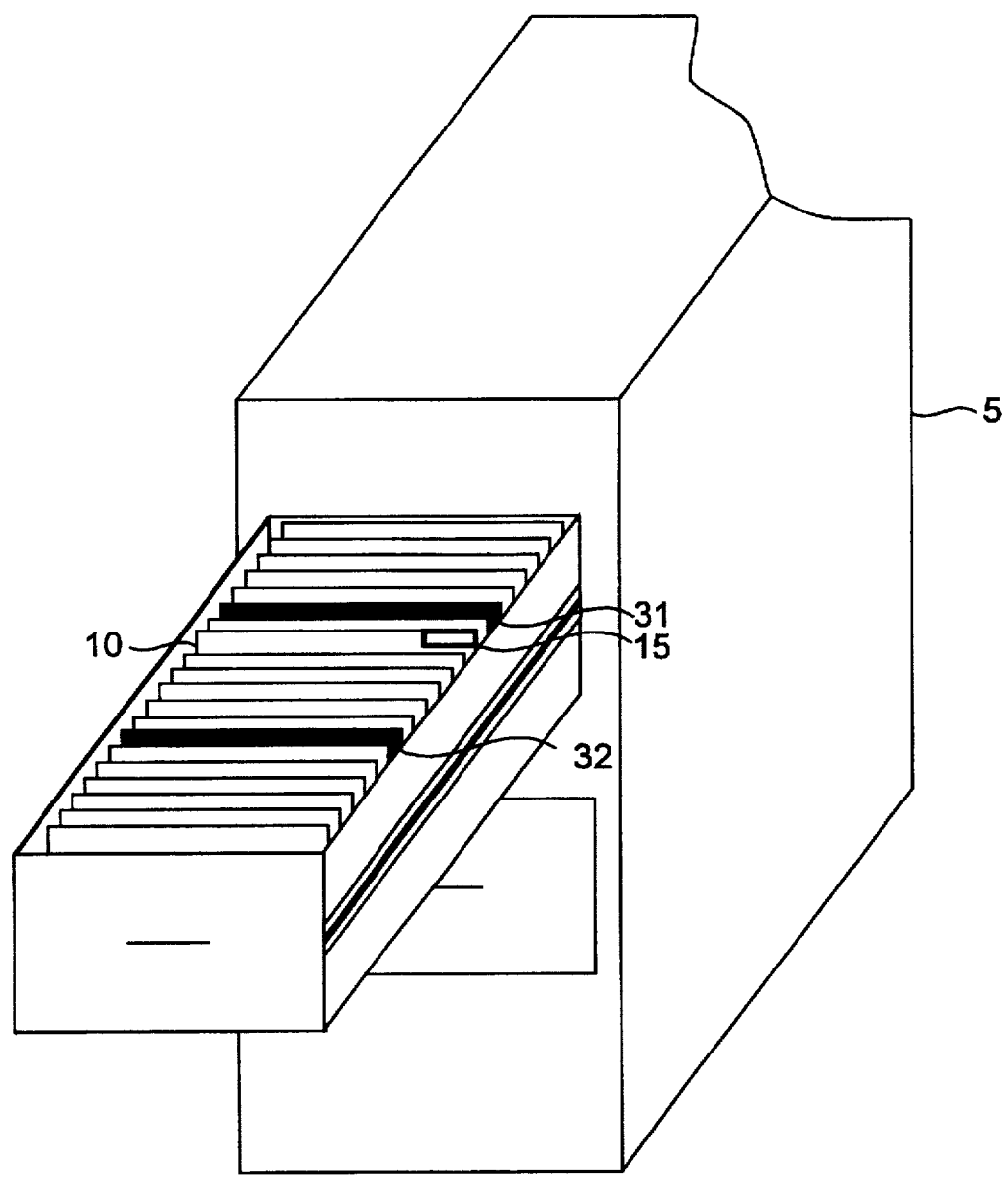
FIG. 3 is an illustration of a second embodiment of an object locator system according to the present invention wherein location markers are used.

In a further embodiment, an object locator system according to the present invention also includes location markers. In FIG. 3, location markers 31, 32, are shown placed in the filing cabinet 5. While two location markers are shown in FIG. 3, more or less of such markers can be used depending on the size of the file storage equipment. Location markers are preferably larger than the electronic tag 15, powered and suitably shaped for the particular application. For example, if the location markers 31 and 32 will be used in a filing cabinet, such as the filing cabinet 5, they should be relatively thin and sized to fit within a typical file drawer. In one embodiment, the electronic tag 15 is suitably configured so that when its response code is transmitted, the tag 15 sends a signal that causes location markers in the vicinity, such as location markers 31 and 32, to emit a sound. Once the activated location markers are located, a manual search can be performed to find the document of interest or an automatic search can continue more rapidly with the user now focused on the general location of the document 10.

Alternatively, the electronic tag 15 can be configured so that when its response code is transmitted, the tag 15 sends a signal to, or receives a signal from, a location marker, and then sends a signal to a suitably configured interrogator 20, which signal is indicative of the proximity of the electronic tag 15 to the location marker. Thus, a message such as "5 inches from LM31" can be provided in the display 22 of the interrogator 20 indicating that the document of interest is 5 inches from location marker 31. In a further embodiment, the location marker, such as location marker 31 or 32 can send a signal to the interrogator 20 indicative of the proximity of the electronic tag 15. Means for determining the proximity of the electronic tag 15 to the location marker 31 or 32 can be located in the interrogator 20, electronic tag 15, the location markers or in a separate device. As will be appreciated by those skilled in the art, various methods are available for determining the proximity of the tag to the location marker. If, for example, the tag 15 contains a radio receiver, it can measure the strength of a radio signal received from the location marker. Knowledge of how much power is transmitted by the location marker and the received signal strength allows calculation of the distance from the electronic tag 15 to the location marker 31. The tag can then transmit the calculated distance to the interrogator 20, or transmit a signal indicative of the received signal strength information to the interrogator, which can then calculate the distance from the location marker to the tag. The design and implementation of such means are within the capabilities of those skilled in the art.

Figure 4:
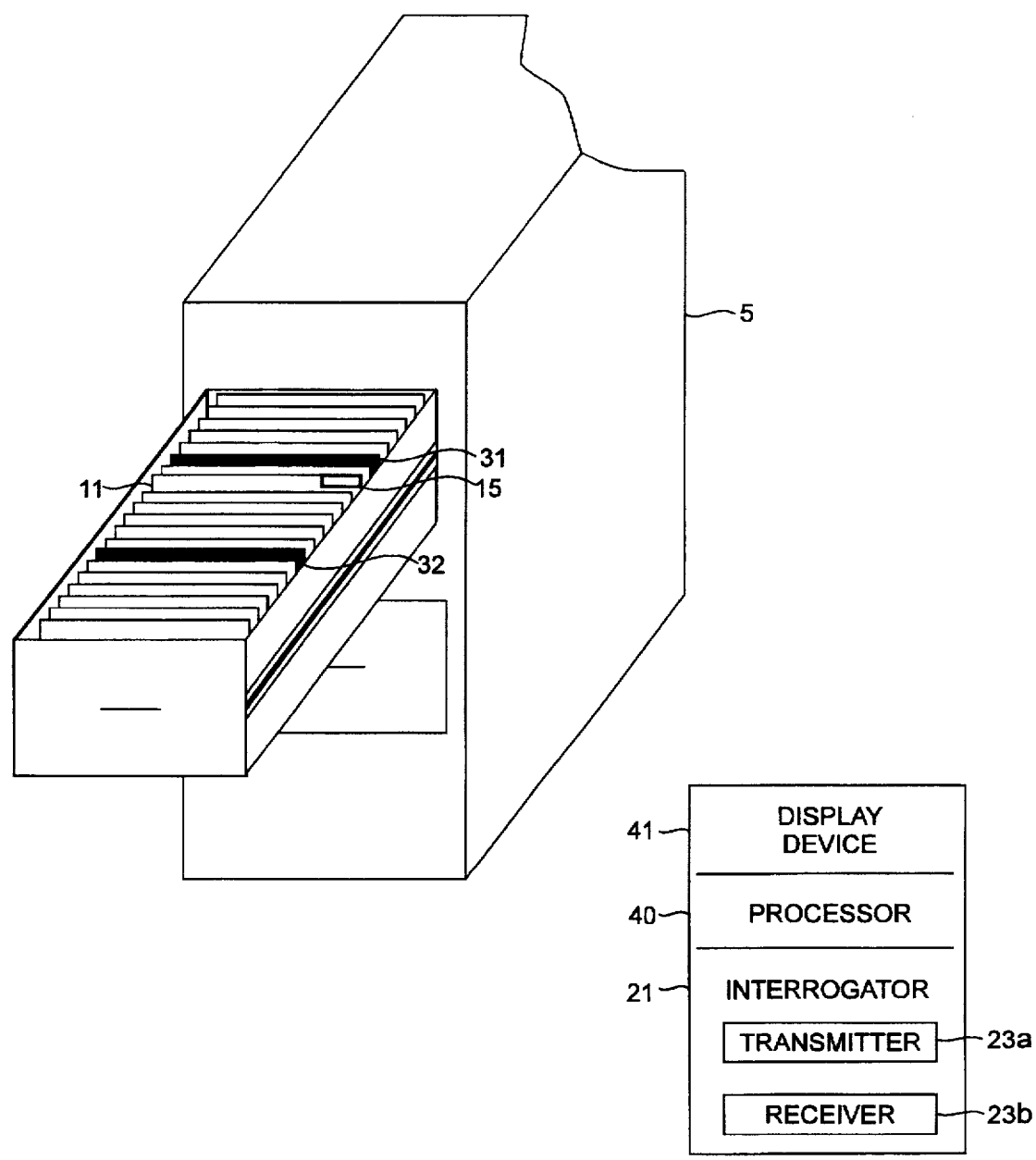
FIG. 4 is an illustration of a third embodiment of an object locator system according to the present invention.
Figure 6:
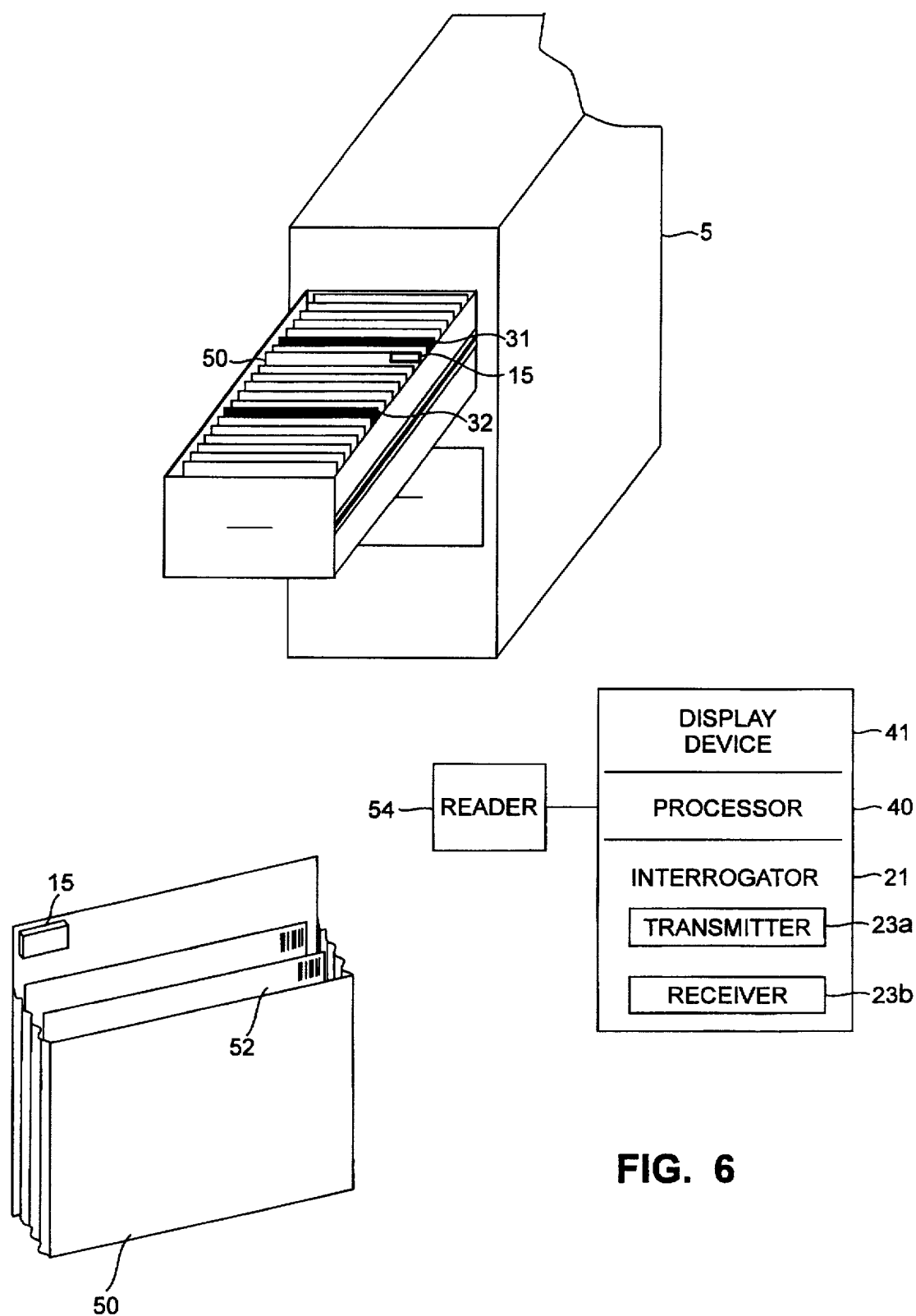
FIG. 6 is an illustration of a fourth embodiment of an object locator system according to the present invention.

In a further embodiment, an object locator system according to the present invention includes a processor or computer, as shown in FIGS. 4 and 6. The computer is accessed for record storage as well as for processing functions. Incorporating a computer in the object locator system is particularly advantageous in applications where files include textual information suitable for storage in computer records as well other material that is not as well suited to computer storage. For example, a computer storage medium may suitably be used to store a patient's medical records. To the extent x-rays or other visual medical scans can be digitized and electronically stored, it may also be desirable to maintain hard copies of the original visual media.

Figure 5:
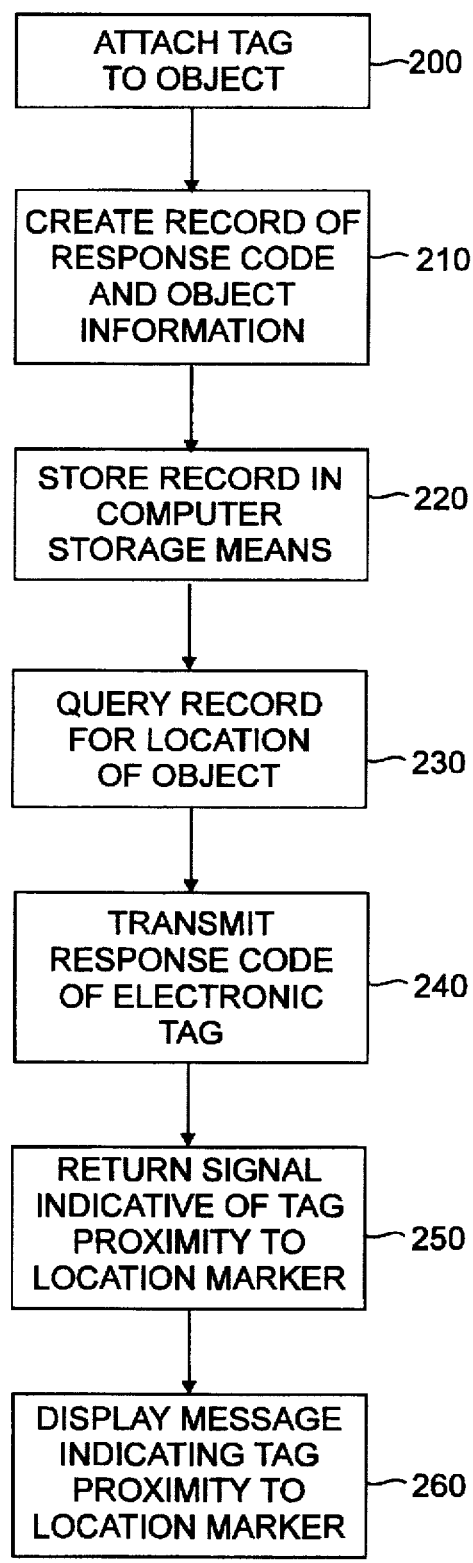
FIG. 5 is a flow diagram illustrating a method for locating an object using the system of FIG. 4.

In the embodiment shown in FIG. 4, a processor 40 is in communication with an interrogator 21 comprising a transmitter 23a and a receiver 23b. Though shown incorporated into the interrogator 21 in FIG. 4, it should be appreciated that the transmitter 23a and receiver 23b may be separate devices. Textual material from a record, such as, without limitation, a patient's medical record, can be kept on a computer storage means such as floppy disks, a hard drive or other suitable memory device associated with the processor 40. If, however, an x-ray 11 or other photographic material form part of the patient's record, physical storage of such material may be desirable. A further embodiment of a method for locating an object, directed to the object locator system shown in FIG. 4, is presented in FIG. 5.

As indicated in operation block 200, an electronic tag 15 is attached to an object, such as the x-ray 11. A record is formed containing the response code for the tag 15 and information concerning the tagged object, as shown in operation block 210. The record is stored in a computer storage means, as indicated in operation block 220. In the present example of medical records, the record created in operation block 210 may form part of a patient's medical record. The x-ray 11 may then be filed in a physical storage container, such as the filing cabinet 5, near location markers, such as the location markers 31 and 32. The computerized record may then be queried for the location of the object, i.e., the x-ray 11, as indicated in operation block 230. Once queried, the processor, in operation block 240, directs the transmitter 23a to transmit the response code for the tag 15. As indicated in operation block 250, a signal is returned to the receiver 23b indicative of the tag's position relative to one or more location markers, which, in the present illustration, are markers 31 and 32. The tag's location can then be displayed on the display device 41 as indicated in operation block 260.

In another embodiment, illustrated in FIG. 6, the electronic tag 15 can be attached to a folder 50 for retaining documents. Each document that is to be stored in the folder 50 has an identifier label 52 providing an identification code. As a document is placed in, or removed from the folder 50, it is scanned by a reader 54 capable of reading the identification code from the label 52. The reader 54 is in communication with a processor, such as the processor 40. A computer record is automatically generated and maintained of the documents placed in, or removed from, the folder 50. The record also contains the response code of the electronic tag 15. Thus, to locate a document, a suitably programmed processor 40 identifies the folder 50 in which the document resides. An indication is provided as to whether the document is in the folder. Further, the processor directs the transmitter 23a to transmit the response code for the tag 15. A signal is returned to the receiver 23b indicative of the tag's position relative to one or more location markers 31 and 32. The tag's location can then be displayed on the display device 41. The identifier label 52 and reader 54 can be a bar code and bar code reader, a printed label scanned by an optical character recognition system, a label with an identification code read by a short range interrogator and the like.

The electronic tag 15 used in conjunction with the present invention can be, without limitation, a low frequency tag using inductive coupling or a radio frequency (RF) tag using modulated backscatter.

The following non-limiting examples are presented to further illustrate the features and benefits of the present methods and systems.

EXAMPLE 1—Random Filing of Documents

A group medical practice may have thousands of patient files. After a period of time, many of such files may be discarded as patients no longer patronize the group practice. Further, over time, additional practitioners may join the group practice, bringing within them many additional patient files. Rather than reorganizing the filing system, it may be convenient to add the files to filing cabinets as space permits. The present invention may be used for this purpose as described below.

An electronic tag 15 is attached to a new patient file. The tag's response code, and the patient's name are recorded in a log such as a notebook or a computer record. The file is then placed in a filing cabinet as space permits. To retrieve the file, the log is consulted to obtain the response code of the tag 15 attached to the patient's file. The response code is entered into a interrogator, and the tag provides an indication of its location in any of the previously described ways depending upon the particulars of the locator system.

EXAMPLE 2—Locating an Incorrectly Filed Document

Filing systems may be organized in a variety of ways. For example, files may be given a numerical designation and filed in numerical order, or they may be alphabetized by subject matter or by a client's or patient's name, to mention a few. When a file is mis-filed in such a system, it may require an extensive and time-consuming search to locate it. The methods and systems of the present invention can be used to simplify the task of locating a mis-filed document as described below.

A file is to be filed in a numerical filing system. An electronic tag 15 is attached to the file. The tag's response code, and a description of the file are recorded in a log such as a notebook or a computer record. The file, which was intended to be numerically filed, is misfiled. To later locate the file, the log is consulted to obtain the response code of the tag 15 attached to the file. The response code is entered into an interrogator, and the tag provides an indication of its location in any of the previously described ways depending upon the particulars of the locator system.

The foregoing examples and embodiments of the present invention are illustrative of the principles of this invention and are not intended to limit the invention in any way. It will be further appreciated that various modifications may occur to those skilled in the art in view of the present teachings without departing from the scope and spirit of the invention.

We claim:

1. A document locator system comprising:

an electronic tag identifiable by a response code and physically adapted to be attached to a document;

an interrogator having a transmitter and a receiver the transmitter operable to transmit the response code; and a location marker, wherein, in response to the interrogator transmitting the response code, the electronic tag sends a first signal to the location marker and a second signal is transmitted to the interrogator, in which the second signal is indicative of the proximity of the electronic tag to the location marker and, hence, the location of a document attached to the electronic tag.

2. The system of claim 1 wherein the interrogator further comprises a display, and wherein the interrogator provides a visual indication in the display of the location of the electronic tag.

3. The system of claim 1 wherein the location of electronic tag relative to the location marker is displayed on a display device.

4. The system of claim 3 further comprising:

a storage device for storing the response code; and a processor in communication with the storage device, the interrogator and the display device, wherein the processor is operable to cause the interrogator to transmit the response code and to display an indication of the tag's proximity to the location marker on the display device.

5. The system of claim 4 further comprising a folder, wherein the electronic tag is attached to the folder, and further comprising:

a document having an identifier label providing an identification code, the document further characterized by a status, wherein the status indicates whether the document is in the folder or not;

a label reader for reading the identification code provided by the identifier label on the documents each time the document is placed in, or removed from, the folder, wherein, the label reader is in communication with the processor and wherein the processor is operable to create and store a record comprising the identification code from the identifier label, the status of the document, and the response code of the electronic tag, and further operable to provide an indication of the folder's proximity to the location marker when the record is accessed so that the location and the status of the document may be determined by accessing the record.

6. A method for locating a document comprising the steps of:

(a) attaching an electronic tag to the document, which electronic tag is characterized by a response code;

(b) recording the response code and descriptive information concerning the document in a storage means;

(c) transmitting the response code using an interrogation device;

(d) sending a first signal from the electronic tag to a location marker in response to transmitting the response code, and also sending a second signal from the electronic tag to the interrogation device, in which the second signal is indicative of the proximity of the electronic tag to the location marker; and (e) locating the document based on the second signal.

7. The method of claim 6 wherein the step of locating further comprises viewing a display that provides the location of the electronic tag relative to the location marker.

8. The method of claim 6 wherein step (b) further comprises forming a record and storing the record in a computer storage means and wherein step (c) further comprises querying the record for the location of the document.

* * * * *